US012657802B2

(12) United States Patent
Iwaki

(10) Patent No.: US 12,657,802 B2
(45) Date of Patent: Jun. 16, 2026

(54) TERMINAL, AND COMMUNICATION SYSTEM

(71) Applicant: POPOPO INC., Tokyo (JP)

(72) Inventor: Shinnosuke Iwaki, Tokyo (JP)

(73) Assignee: POPOPO INC., Tokyo (JP)

( * ) Notice: Subject to any disclaimer, the term of this patent is extended or adjusted under 35 U.S.C. 154(b) by 0 days.

(21) Appl. No.: 18/701,855

(22) PCT Filed: Oct. 31, 2022

(86) PCT No.: PCT/JP2022/040768
§ 371 (c)(1),
(2) Date: Apr. 16, 2024

(87) PCT Pub. No.: WO2023/080121
PCT Pub. Date: May 11, 2023

(65) Prior Publication Data
US 2025/0225707 A1      Jul. 10, 2025

(30) Foreign Application Priority Data

Nov. 2, 2021    (JP) .................................. 2021-179204

(51) Int. Cl.
*G06T 13/80*        (2011.01)
*G06T 13/40*        (2011.01)
*H04L 67/131*      (2022.01)
(52) U.S. Cl.
CPC .............. *G06T 13/40* (2013.01); *G06T 13/80* (2013.01); *H04L 67/131* (2022.05)
(58) Field of Classification Search
CPC ........ G06T 13/40; G06T 13/80; H04L 67/131
See application file for complete search history.

(56) References Cited

U.S. PATENT DOCUMENTS

| | | | |
|---|---|---|---|
| 2002/0178011 A1 | 11/2002 | Yotoriyama et al. | |
| 2017/0103564 A1* | 4/2017 | Hayashida | .............. A63F 13/56 |
| 2022/0014713 A1 | 1/2022 | Sato et al. | |
| 2022/0232191 A1 | 7/2022 | Kawakami et al. | |
| 2024/0144413 A1* | 5/2024 | Ishii | ....................... G06Q 50/01 |

FOREIGN PATENT DOCUMENTS

| | | | |
|---|---|---|---|
| JP | 2002-351806 A | | 12/2002 |
| JP | 2011-61450 A | | 3/2011 |
| JP | 6684952 B1 | | 4/2020 |
| JP | 2020080154 A | * | 5/2020 |
| WO | 2020/095714 A1 | | 5/2020 |

OTHER PUBLICATIONS

International Search Report for PCT/JP2022/040768 dated Dec. 20, 2022 (PCT/ISA/210).

* cited by examiner

*Primary Examiner* — Towfiq Elahi
(74) *Attorney, Agent, or Firm* — Sughrue Mion, PLLC

(57)                    ABSTRACT

A terminal includes: an acquiring unit that acquires action data of the user participating in the conversation in the virtual space; a generating unit that generates control data of an avatar corresponding to the user from action data of the user and generates control data indicating an action that makes it easy for the avatar to speak after detecting a prescribed action of the user who is about to speak in the action data of the user; a transmitting unit that transmits the control data; and a reproducing unit that makes the avatar active in the virtual space according to the control data.

12 Claims, 8 Drawing Sheets

TERMINAL, AND COMMUNICATION SYSTEM

CROSS REFERENCE TO RELATED APPLICATIONS

This application is a National Stage application under 35 U.S.C. § 371 of International Application No. PCT/JP2022/040768, filed Oct. 31, 2022, which claims priority to Japanese Patent Application No. 2021-179204 filed on Nov. 2, 2021. The disclosure of the prior application is considered part of the disclosure of this application.

TECHNICAL FIELD

The present invention relates to a terminal, and communication system.

BACKGROUND ART

When a prescribed trigger is detected in a virtual space where avatars are arranged, there is a method of changing the arrangement of an avatar relating to the trigger (see Patent Literature 1). Specifically, when an avatar starts a conversation, a content distribution server changes the arrangement of the avatar in the virtual space.

CITATION LIST

Patent Literature

Patent Literature 1: Japanese Patent No. 6684952

SUMMARY OF THE INVENTION

Problems to be Solved by the Invention

When a plurality of users have a conversation via a network, a user may not be able to speak due to other users speaking. However, in Patent Literature 1, the arrangement of the avatar who has started the conversation is merely changed. Patent Literature 1 does not provide an environment in which the users participating in the conversation in the virtual space can easily speak.

The present invention has been made in consideration of the above circumstance, and an object of the present invention is to provide a technology capable of realizing an environment in which a user participating in a conversation in a virtual space can speak easily.

Means to Solve the Problems

A processing device of one aspect of the present invention includes: an acquiring unit that acquires action data of a user participating in a conversation in a virtual space; a generating unit that generates control data of an avatar corresponding to the user from the action data of the user and generates control data indicating an action that makes it easy for the avatar to speak after detecting a prescribed action of the user who is about to speak in the action data of the user; a transmitting unit that transmits the control data; and a reproducing unit that makes the avatar active in the virtual space according to the control data.

A processing method of one aspect of the present invention includes: a computer acquiring action data of a user participating in a conversation in a virtual space; the computer generating control data of an avatar corresponding to the user from the action data of the user and generating control data indicating an action that makes it easy for the avatar to speak after detecting a prescribed action of the user who is about to speak in the action data of the user; the computer transmitting the control data; and the computer making the avatar active in the virtual space according to the control data.

A communication system of one aspect of the present invention includes: a first terminal used by a first user participating in a conversation in a virtual space; and a second terminal that is connected to the first terminal and is used by a second user participating in the conversation; in which the first terminal includes: an acquiring unit that acquires action data of the first user; a generating unit that generates control data of a first avatar corresponding to the first user from the action data of the first user and generates control data indicating an action that makes it easy for the avatar to speak after detecting a prescribed action of the first user who is about to speak in the action data of the first user; a transmitting unit that transmits the control data to the second terminal; a receiving unit that receives other avatar control data from the second terminal; and a reproducing unit that makes the first avatar active in the virtual space according to the control data and makes a second avatar corresponding to the second user active according to the other avatar control data.

A communication system of one aspect of the present invention includes: a first terminal used by a first user participating in a conversation in a virtual space; and a second terminal that is connected to the first terminal and is used by a second user participating in the conversation, in which the first terminal includes: an acquiring unit that acquires action data of the first user; a generating unit that generates control data of a first avatar corresponding to the first user from the action data of the first user and generates instruction data indicating that the first avatar is about to speak after detecting a prescribed action of the first user who is about to speak in the action data of the first user; and a transmitting unit that transmits the instruction data to the second terminal, the second terminal includes: an acquiring unit that acquires action data of the second user; a generating unit that generates control data of a second avatar corresponding to the second user from the action data of the second user and generates control data of the second avatar indicating an action of focusing on the first avatar after receiving the instruction data; and a transmitting unit that transmits the control data of the second avatar to the first terminal, and the first terminal further includes: a reproducing unit that makes the first avatar active in the virtual space according to the control data of the first avatar and makes the second avatar active according to the control data of the second avatar.

A program of one aspect of the present invention for causing a computer to function as: an acquiring unit that acquires action data of a user participating in a conversation in a virtual space; a generating unit that generates control data of an avatar corresponding to the user from the action data of the user and generates control data indicating an action that makes it easy for the avatar to speak after detecting a prescribed action of the user who is about to speak in the action data of the user; a transmitting unit that transmits the control data; and a reproducing unit that makes the avatar active in the virtual space according to the control data.

A recording medium of one aspect of the present invention storing a program for causing a computer to function as: an acquiring unit that acquires action data of a user participating in a conversation in a virtual space; a generating unit that generates control data of an avatar corresponding to the user from the action data of the user and generates control data indicating an action that makes it easy for the avatar to speak after detecting a prescribed action of the user who is about to speak in the action data of the user; a transmitting unit that transmits the control data; and a reproducing unit that makes the avatar active in the virtual space according to the control data.

Effects of Invention

According to the present invention, it is possible to provide a technology capable of realizing an environment in which a user participating in a conversation in a virtual space can speak easily.

BRIEF DESCRIPTION OF DRAWINGS

FIG. 2 is a diagram for explaining functional blocks of a terminal according to the embodiment of the present invention.

FIG. 5 is a diagram for explaining functional blocks of a terminal according to a modified example.

DESCRIPTION OF EMBODIMENT

Figure 1:
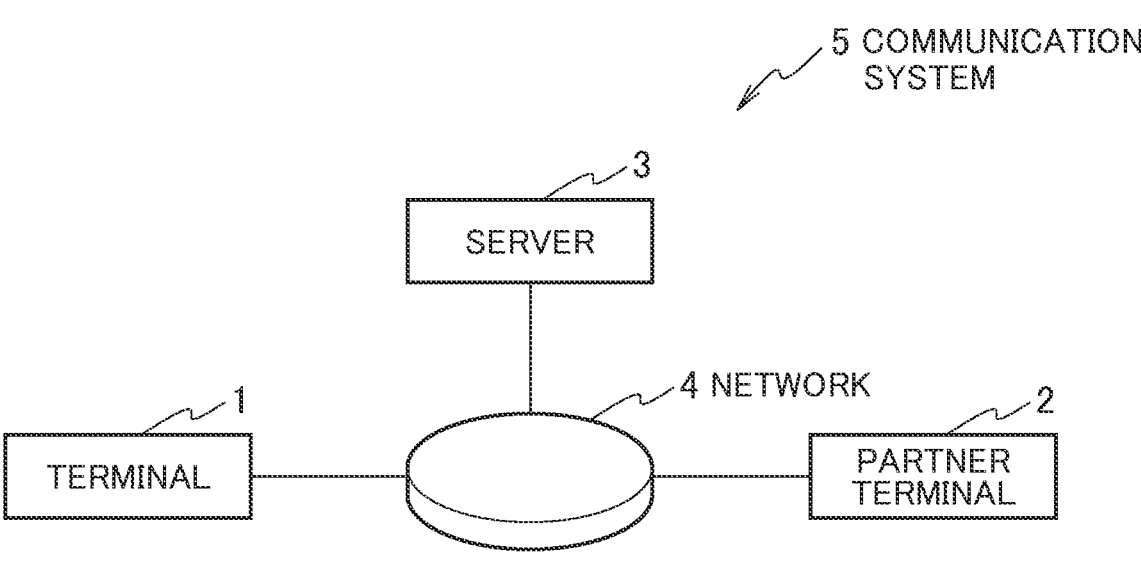
FIG. 1 is a diagram for explaining a configuration of a communication system according to an embodiment of the present invention.

An embodiment of the present invention will be described below with reference to the drawings. In the description of the drawings, the same part are denoted with the same reference numerals, and a description thereof will be omitted.
(Communication System)
With reference to FIG. 1, a communication system 5 according to an embodiment of the present invention will be described. The communication system 5 includes a terminal 1, a partner terminal 2, and a server 3. The terminal 1, the partner terminal 2, and the server 3 can communicate with each other via a network 4. It is sufficient if the number of the terminal 1 and the partner terminal 2 in the communication system 5 is one or more.

The terminal 1 and the partner terminal 2 have the same configuration and are general computers such as personal computers and smartphones. Each avatar has a conversation in a virtual space by the operation of the terminal 1 and the partner terminal 2. Each user of the terminal 1 and the partner terminal 2 operates each avatar active in the virtual space. In the embodiment of the present invention, each avatar has a conversation with another avatar to communicate with a user corresponding to the other avatar or holds a web conference.

The terminal 1 and the partner terminal 2 transmit and receive control data for specifying a movement of an avatar, speech data (not shown) indicating the content to be spoken by an avatar, and the like. The speech data may be text data or voice data, and is input from a user of the terminal 1. Each of the terminal 1 and the partner terminal 2 reproduces speech data, control data, and the like acquired from a self-terminal and another terminal. The terminal 1 and the partner terminal 2 generate and display video data of the virtual space in which each avatar corresponding to the terminal 1 and the partner terminal 2 is active.

The server 3 relays speech data, control data, and the like which are necessary between the terminal 1 and the partner terminal 2 in order to realize a conversation made by each avatar in the virtual space. The server 3 transmits each data transmitted from the terminal 1 to the partner terminal 2, and transmits each data transmitted from the partner terminal 2 to the terminal 1. A case will be described in which the server 3 relays communication between the terminal 1 and the partner terminal 2 in the embodiment of the present invention, but the present invention is not limited thereto. The terminal 1 and the partner terminal 2 may communicate with each other by means of P2P (Peer to Peer) or the like without the intervention of the server.

The embodiment of the present invention achieves an environment in which a user participating in a conversation can easily speak by using an avatar active in a virtual space. There is a case where, in the virtual space, an avatar tries to speak to another avatar, but is not be able to start speaking because the other avatar starts speaking. In such a case, the terminal 1 according to the embodiment of the present invention controls an action of the avatar who tries to speak such that the avatar who tries to speak can speak easily.
(Terminal)
With reference to FIG. 2, the terminal 1 according to the embodiment of the present invention will be described. The partner terminal 2 has the same configuration as the terminal 1 shown in FIG. 2.

The terminal 1 includes an input device 11, an output device 12, action data 21, control data 22, other avatar control data 23, an acquiring unit 31, a generating unit 32, a transmitting unit 33, a receiving unit 34, and a reproducing unit 35. Each of the action data 21, control data 22, and other avatar control data 23 is stored in a storage device such as a memory 902 or a storage 903. Each function of the acquiring unit 31, generating unit 32, transmitting unit 33, receiving unit 34, and reproducing unit 35 is implemented using a CPU 901.

The input device 11 is a device for inputting a user's instruction to the terminal 1, and is a keyboard, a mouse, and a motion capture attached to the user. The output device 12 may be a display device and a head mounted display.

The action data 21 is data for specifying an action of an avatar input by the user of the terminal 1. Generally, an action of an avatar active in a virtual space is determined by an input from a user who operates the avatar. The action data 21 is generated from a movement of the user himself/herself obtained by the movement capture from a sensor attached to the user, for example. The action data 21 may be generated from the action of the avatar specified by the user using a keyboard, mouse, or the like.

The control data 22 is data for specifying an action of an avatar corresponding to the user of the terminal 1 in the virtual space. The control data 22 is generated by the generating unit 32. The control data 22 is reproduced by the terminal 1 and the partner terminal 2. In the embodiment of the present invention, the control data 22 may be generated according to an action indicated by the action data 21, or may be generated after conversion from an action different from that indicated by the action data 21.

The other avatar control data 23 is data for specifying an action of an avatar corresponding to a user of the partner terminal 2 in the virtual space. The other avatar control data 23 is generated by the partner terminal 2 and acquired from the partner terminal 2. The other avatar control data 23 is reproduced by the terminal 1 and the partner terminal 2.

The acquiring unit 31 acquires the action data 21 of the user who participates in the conversation in the virtual space. The acquiring unit 31 acquires data of the action of the avatar specified by the user using motion capture, a keyboard, or the like. A method by which the acquiring unit 31 acquires the action data 21 is not limited thereto.

The generating unit 32 generates the control data 22 of the avatar corresponding to the user of the terminal 1. The generating unit 32 normally generates the control data 22 of the avatar corresponding to the user from the action data 21 of the user. It is sufficient if the control data 22 is generated with reference to the action data 21, and it is not necessary for the avatar to move in the same way as in the action data 21. The generating unit 32 normally generates the control data 22 by using data of a prescribed part of the action data 21, such as the user's facial expression or eye line. At this time, the generating unit 32 may generate the control data 22 by converting a parameter of the movement in the action data 21 such as deforming the movement. The generating unit 32 generates the control data 22 by replacing a part of the action data 21, such as a gesture, which is not reflected from the action data 21 with data for the part determined based on a prescribed rule. It is sufficient if the control data 22 partially depends on the action data 21, and the control data 22 may not be generated only from the action data 21. Further, the generating unit 32 may refer to data other than the action data 21 to generate the control data 22. The generating unit 32 may estimate the user's emotion from speech data input from the user and generate the control data 22 so as to respond to the emotion, for example. The user's emotion may be analyzed from the speech content, or if the speech data is voice data, the user's emotion may be analyzed from frequency characteristics of the voice.

When detecting a prescribed action of the user who is about to speak in the user's action data 21, the generating unit 32 generates the control data 22 indicating an action that makes it easy for the avatar to speak. The transmitting unit 33 transmits the control data 22 to the partner terminal 2. When detecting the prescribed action of the user who is about to speak in the user's action data 21, for a part related to the action that makes it easy for the avatar to speak, the generating unit 32 generates the control data 22 by converting to, data of an action that makes it easy for the avatar to speak, data generated with reference to the action data 21 or data for the part determined based on a prescribed rule. Further, the generating unit 32 refers to the action data 21 to generate the control data 22 for a part other than the part related to the action that makes it easy for the avatar to speak, as in the normal case.

The generating unit 32 normally generates the control data 22 such that the avatar can be active in the virtual space according to the action of the avatar input by the user. When it is detected, in the action data 21 of the user, that the user has not spoken although the user has been about to speak, the generating unit 32 generates the control data 22 such that the avatar can speak easily in the virtual space regardless of the action data 21.

When an action specified in the action data 21 is a prescribed action, the generating unit 32 detects that the user has not spoken although the user has been about to speak. The prescribed action is, for example, an action indicating that the user has not spoken although the user has been about to speak such as a mouth half opened for a certain period of time, one hand raised lightly, a mouth half opened, the occurrence of a change in a facial expression, nodding, or an action of the user to indicate consent. The prescribed action may include a state in which no speech data is detected within a prescribed period of time in the action data 21.

The generating unit 32 may detect, from a detection model generated in advance, that the user has not been able to speak although the user has been about to speak. The generating unit 32 generates a model capable of detecting, from the past action data, that the user has not been able to speak although the user has been about to speak. With reference to the generated model, the generating unit 32 determines whether the newly input action data 21 indicates a state where the user has not been able to speak although the user has been about to speak.

When detecting that the user is about to speak, the generating unit 32 generates the control data 22 to achieve the action that makes it easy for the avatar to speak. When detecting a prescribed action of the user who is about to speak in the action data 21, the generating unit 32 generates the control data 22 indicating the action that makes it easy for the avatar to speak for a part related to the action in which the avatar can speak easily. The action that makes it easy for the avatar to speak is, for example, an action that makes it easy for another avatar to pay attention to the avatar. Specific examples of the action that makes it easy for the avatar to speak include raising a hand, opening a mouth, changing a facial expression, leaning forward, approaching a position of the current speaker, or approaching another participant. The generating unit 32 converts a part related to this kind of action into the action that makes it easy for the avatar to speak, and generates the control data 22. For a part other than the above, the generating unit 32 generates the control data 22 with reference to the action data 21 or according to a prescribed rule.

Due to the avatar attracting attention from another avatar, it becomes easy for the user of the avatar to input a command to make the avatar speak. Even if another avatar is speaking, due to the avatar attracting attention, the interruption of the speech made by another avatar is prompted, and it becomes easy for the user of the terminal 1 to input a command to make the avatar speak.

When detecting the action of the user who is about to speak in the action data 21, the generating unit 32 converts the action into an action in which the avatar corresponding to the user easily attracts attention, and controls the action of the avatar in the virtual space. As a result, in the virtual space, it becomes easy for the avatar of the user to attract attention from an avatar of another user and to speak.

The generating unit 32 generates the control data 22 by converting some data of the action data 21. The generating unit 32 may generate the control data 22 by converting a part of the action data 21 related to the action in which the avatar easily attracts attention, and converting a part other than the above according to the action data 21. Alternatively, the generating unit 32 may generate the control data 22 without referring to the action data 21.

If the avatar does not speak after transmitting, to the partner terminal 2, the control data 22 indicating the action that makes it easy for the avatar to speak, the generating unit 32 generates the control data 22 from the action data 21. A case where the avatar does not speak is specifically a case where the user does not input the speech data within a prescribed time after transmission of the control data 22 generated by the generating unit 32 to the partner terminal 2. If the avatar does not speak, even though the action that makes it easy for the avatar to speak, the generating unit 32 generates the control data 22 so as to make the avatar act according to the action data 21 as usual.

The control data 22 generated by the generating unit 32 is transmitted to the partner terminal 2 by the transmitting unit 33. The user of the partner terminal 2 detects that the user of the terminal 1 is about to speak, and can prompt the avatar of the terminal 1 to speak by focusing on the avatar of the terminal 1 or interrupting his/her own conversation. However, if the avatar of the terminal 1 does not speak, the generating unit 32 interrupts the generation of the control data 22 from the action in which the avatar of the terminal 1 easily attracts attention, and generates the control data 22 from the action data 21. As a result, it is possible to make each avatar act naturally in the virtual space.

The receiving unit 34 receives the other avatar control data 23 from the partner terminal 2. The receiving unit 34 sequentially receives pieces of other avatar control data 23 from the partner terminal 2 and causes the reproducing unit 35 to reproduce them. The receiving unit 34 may receive, from the partner terminal 2, speech data indicating the content to be spoken by another avatar.

The reproducing unit 35 reproduces the control data 22 and other avatar control data 23 and generates video data in which a plurality of avatars are active in a virtual space. The reproducing unit 35 makes the avatar corresponding to the user of the terminal 1 active in the virtual space according to the control data 22. Further, the reproducing unit 35 makes a second avatar corresponding to the user of the partner terminal 2 active in the virtual space according to the other avatar control data 23. The reproducing unit 35 may display text data, generate speech data from the text data, or reproduce the speech data according to the speech data indicating the content to be spoken by the avatar. The video data is displayed by the output device 12.

When the prescribed action of the user who is about to speak is detected in the action data 21, the generating unit 32 generates the control data 22 indicating the action that makes it easy for the avatar to speak. The reproducing unit 35 also makes the avatar active in the virtual space according to the control data 22 indicating the action that makes it easy for the avatar to speak.

Figure 3:
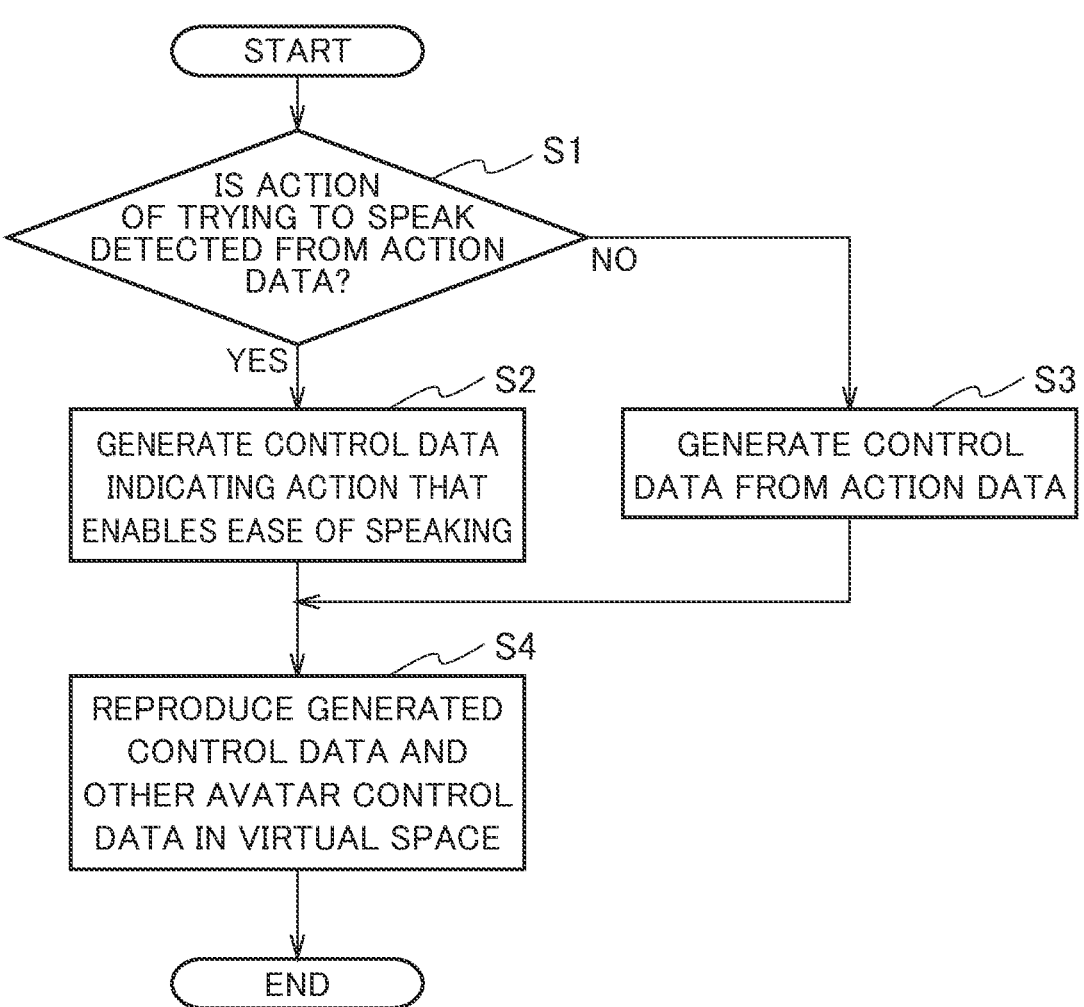
FIG. 3 is a flowchart showing an example of processing performed by the terminal according to the embodiment of the present invention.

With reference to FIG. 3, processing performed by the terminal 1 will be described. The processing shown in FIG. 3 is an example and is not limited thereto.

In step S1, the terminal 1 determines whether the action of the user who is about to speak is detected from the action data 21.

If the action is detected, in step S2, the terminal 1 generates the control data 22 indicating the action that makes it easy for the avatar to speak. Alternatively, if the action is not detected, in step S3, the terminal 1 generates the control data 22 from the action data 21.

In step S4, the terminal 1 reproduces the control data 22 generated in step S2 or S3. At this time, the terminal 1 reproduces how each avatar is active in the virtual space with reference to the other avatar control data 23 received from the partner terminal 2 and the speech data input from the user or the partner terminal 2.

Figure 4:
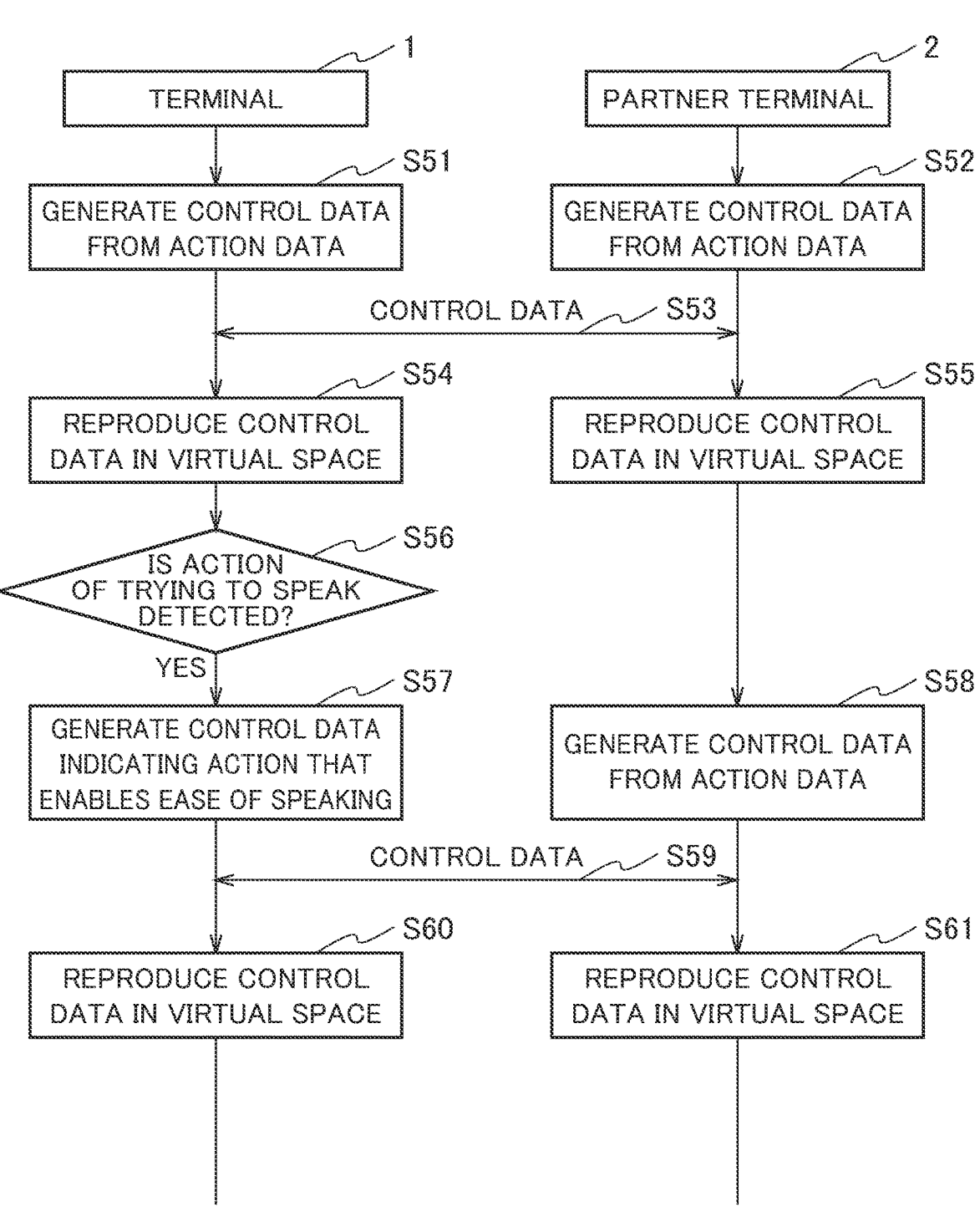
FIG. 4 is a sequence diagram for explaining an example of processing performed in the communication system according to the embodiment of the present invention.

With reference to FIG. 4, processing performed in the communication system 5 will be described. The processing shown in FIG. 4 is an example and is not limited thereto.

In step S51, the terminal 1 generates the control data 22 from the action data 21. In step S52, the partner terminal 2 generates the control data (other avatar control data 23) from the action data input from the user of the partner terminal 2.

In step S53, the control data 22 generated by the terminal 1 is transmitted to the partner terminal 2, and the control data generated by the partner terminal 2 is transmitted to the terminal 1. In steps S54 and S55, each of the terminal 1 and the partner terminal 2 reproduces video data in which each avatar is active in the virtual space according to control data generated by a self-terminal and control data generated by another terminal.

In step S56, the terminal 1 detects the action of the avatar who is about to speak in the action data 21. In step S57, the terminal 1 generates the control data 22 indicating the action that makes it easy for the avatar to speak. If the terminal 1 does not detect the action of the avatar who is about to speak in the action data 21, in step S58, the partner terminal 2 generates the control data from the action data.

In step S59, the control data 22 generated by the terminal 1 is transmitted to the partner terminal 2, and the control data generated by the partner terminal 2 is transmitted to the terminal 1. In steps S60 and S61, the terminal 1 and the partner terminal 2 reproduce video data in which each avatar is active in a virtual space according to control data generated by a self-terminal and control data generated by another terminal. The avatar of the terminal 1 performs the action that makes it easy for the avatar to speak in the virtual space reproduced by each of the terminal 1 and the partner terminal 2 regardless of the action data 21 input by the user of the terminal 1.

In the embodiment of the present invention, if the terminal detects the action of the user who is about to speak in the action data 21 input from the user of the terminal 1, the terminal generates the control data 22 indicating the action that makes it easy for the avatar to speak. The generated control data 22 is reproduced by the terminal 1 and the partner terminal 2, and information that the avatar is about to speak is recognized among participants having a conversation. An environment is achieved in which the avatar of the terminal 1 can speak easily due to other avatars who stop speaking, and the user of the terminal 1 can obtain an opportunity in which the avatar can speak easily. In this way, the terminal 1 can realize an environment in which a user participating in a conversation in a virtual space can speak easily.

Modified Example

In the embodiment of the present invention, a case has been described in which the action of the avatar who tries to speak is controlled and an environment is realized in which the avatar can speak easily. In a modified example, a case will be described in which an action of an avatar other than an avatar who tries to speak is controlled and an environment is realized in which the avatar who tries to speak can speak easily.

Figure 5:
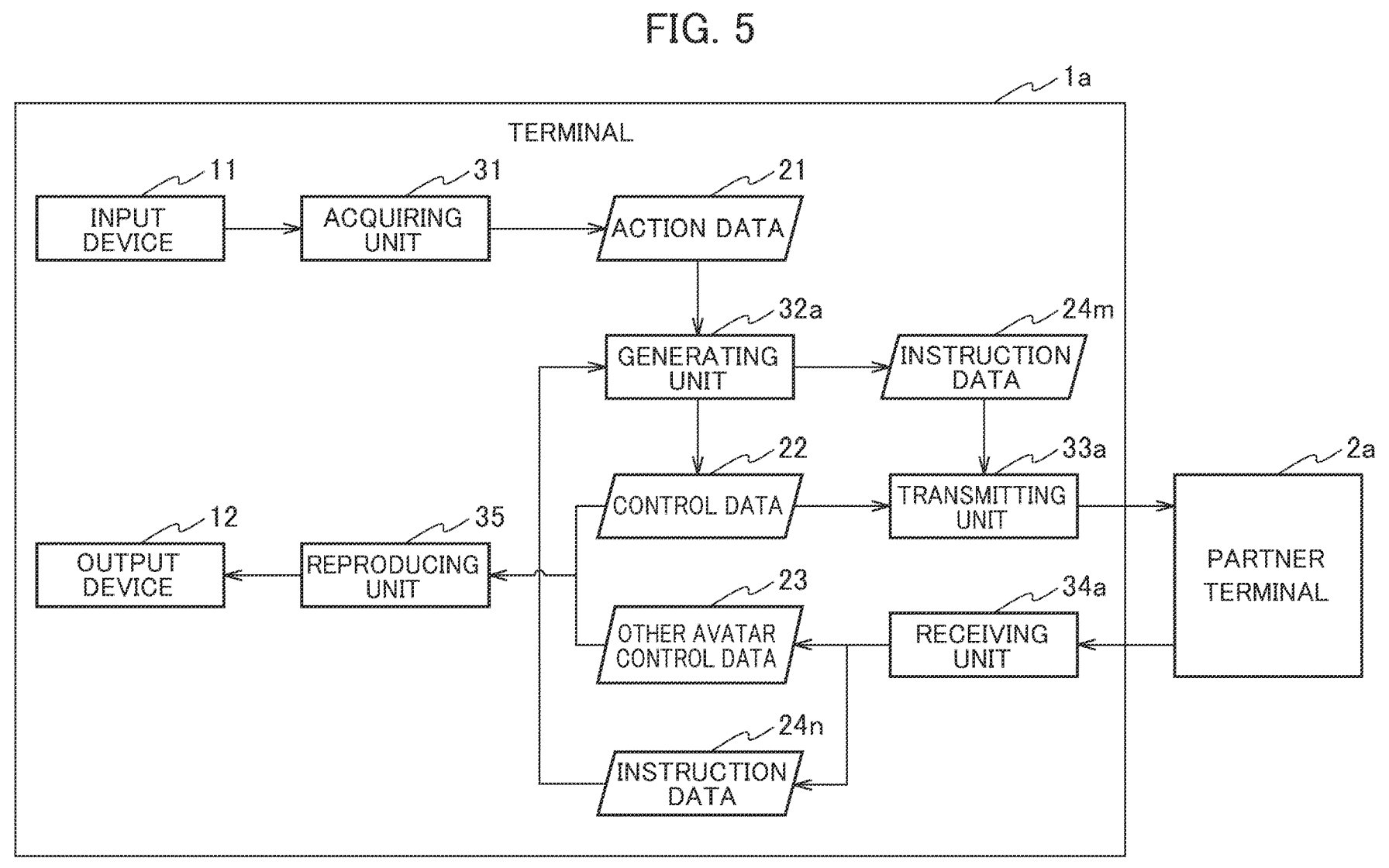

With reference to FIG. 5, a terminal 1a according to a modified example will be described. A partner terminal 2a has the same configuration as the terminal 1a.

Figure 2:
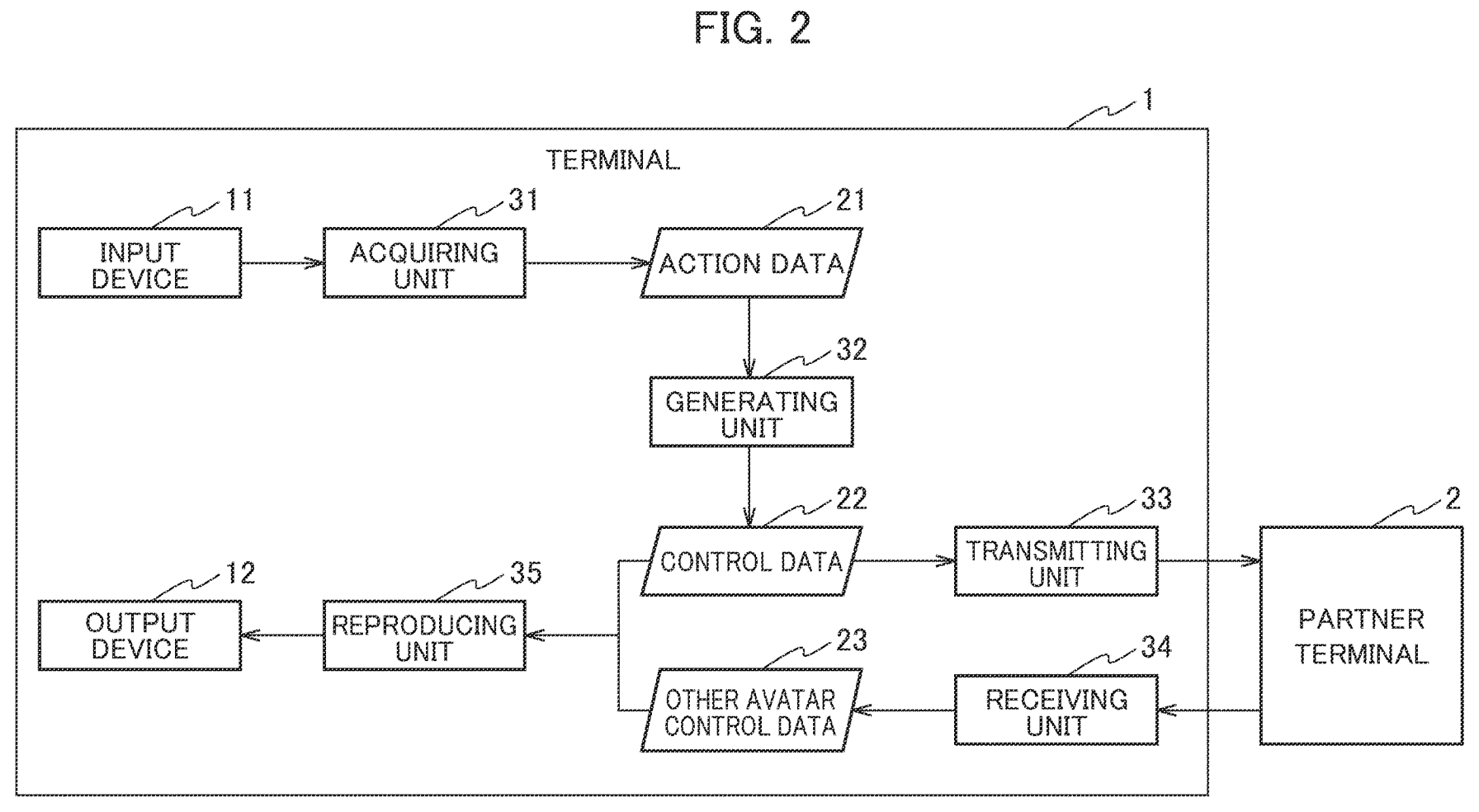

The terminal 1a according to the modified example differs from the terminal 1 shown in FIG. 2 in that the terminal 1a has instruction data 24*m* and 24*n*. Further, processing performed by a generating unit 32*a*, a transmitting unit 33*a*, and a receiving unit 34*a* of the terminal 1*a* is different from that of the terminal 1.

The instruction data 24*m* indicates that a user corresponding to the terminal 1*a* tries to speak. The instruction data 24*m* is generated by the generating unit 32*a* and transmitted to the partner terminal 2*a* by the transmitting unit 33*a*.

The instruction data 24*n* indicates that an avatar corresponding to a user corresponding to the partner terminal 2*a* tries to speak. The instruction data 24*n* is transmitted to the partner terminal 2*a* by the receiving unit 34*a*. The instruction data 24*n* is processed by the generating unit 32*a*.

When receiving the instruction data 24*n* indicating that the avatar corresponding to the user of the partner terminal 2*a* is about to speak, the generating unit 32*a* generates control data 22 indicating an action of focusing on the avatar corresponding to the user of the partner terminal 2*a*. The action of focusing on the avatar corresponding to the user of the partner terminal 2*a* is an action of making an avatar corresponding to the user of the terminal 1*a* face a direction of the avatar who is about to speak. The generating unit 32*a* may refer to action data 21 input by a user to generate the control data 22.

Further, after detecting a prescribed action of a user who is about to speak in action data of the user, the generating unit 32*a* generates instruction data 24*m* indicating that an avatar corresponding to the user is about to speak. By notifying the partner terminal 2*a* that the avatar corresponding to the user of the terminal 1*a* is about to speak, the unit prompts the avatar of the partner terminal 2*a* to perform an action that makes it easier for the avatar of the terminal 1*a* to speak.

A reproducing unit 35 reproduces the control data 22 and other avatar control data 23 and generates video data in which a plurality of avatars are active in a virtual space. When the user of the terminal 1*a* is about to speak, the reproducing unit 35 reproduces video data in which other avatars other than the avatar corresponding to the user of the terminal 1*a* focus on the avatar. This makes it easier for the user of the terminal 1*a* to speak.

Figure 6:
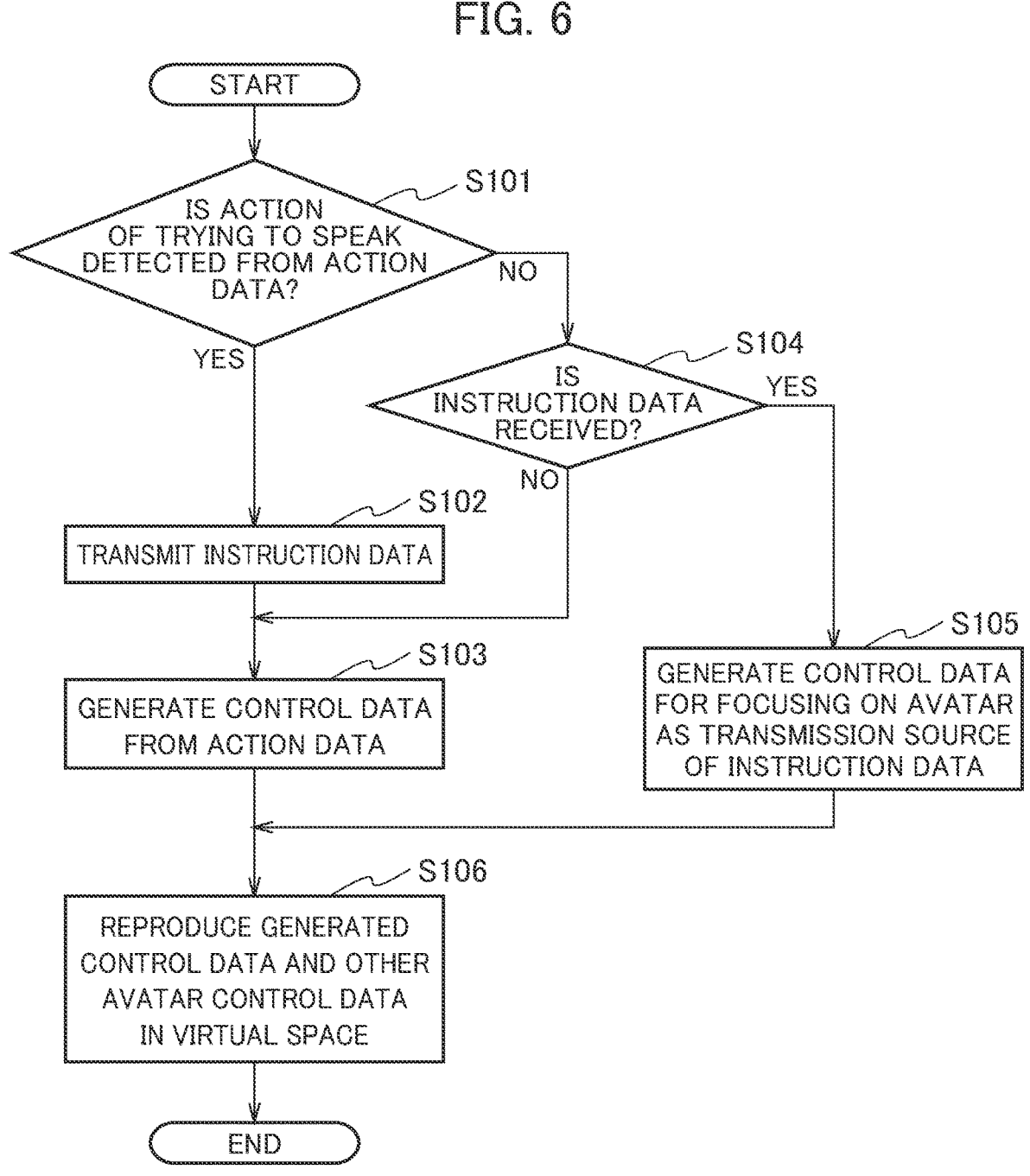
FIG. 6 is a flowchart showing an example of processing performed by the terminal according to the modified example.

With reference to FIG. 6, processing performed by the terminal 1*a* will be described. The processing shown in FIG. 6 is an example and is not limited thereto.

In step S101, the terminal 1*a* determines, from the action data 21, whether the action of the user who is about to speak is detected.

If the terminal 1*a* detects the action, in step S102, the terminal 1*a* generates the instruction data 24*m* indicating that the user is about to speak and transmits the data to the partner terminal 2*a*. Further, in step S103, the terminal 1*a* generates the control data 22 from the action data 21. If the terminal 1*a* does not detect the action in step S101 and the instruction data 24*n* is not received in step S104, the terminal 1*a* generates the control data 22 from the action data 21 in step S103. If the instruction data 24*n* is received in step S104, in step S105, the terminal 1*a* generates control data 22 for focusing on the avatar corresponding to the user of the partner terminal 2*a* that transmits the instruction data 24*n*.

In step S106, the terminal 1*a* reproduces the control data 22 generated in step S103 or S105. At this time, the terminal 1*a* also refers to the other avatar control data 23 received from the partner terminal 2*a* and speech data input from the user or the partner terminal 2*a*, and reproduces how each avatar is active in the virtual space.

Figure 7:
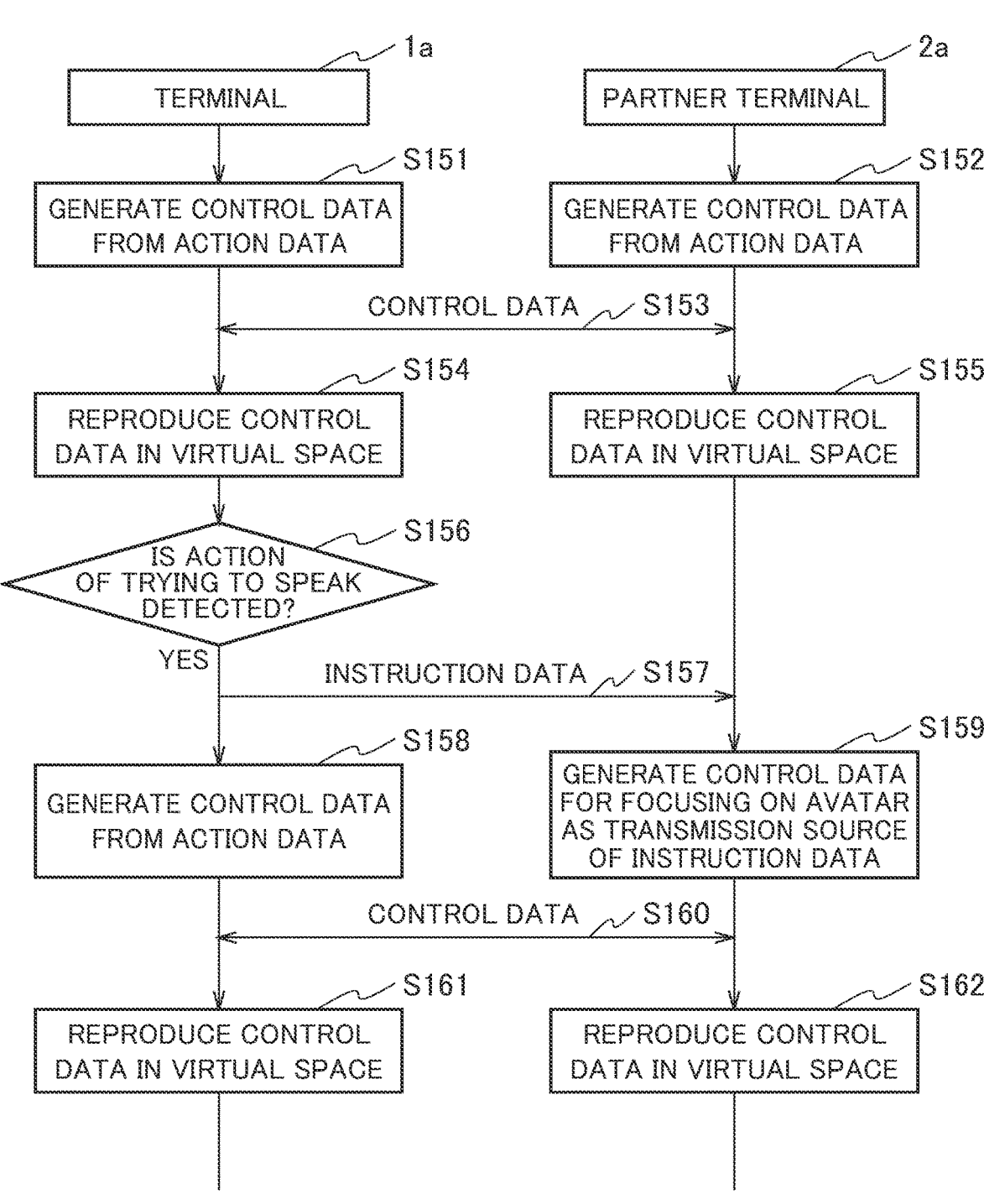
FIG. 7 is a sequence diagram for explaining an example of processing performed in a communication system according to the modified example.
Figure 8:
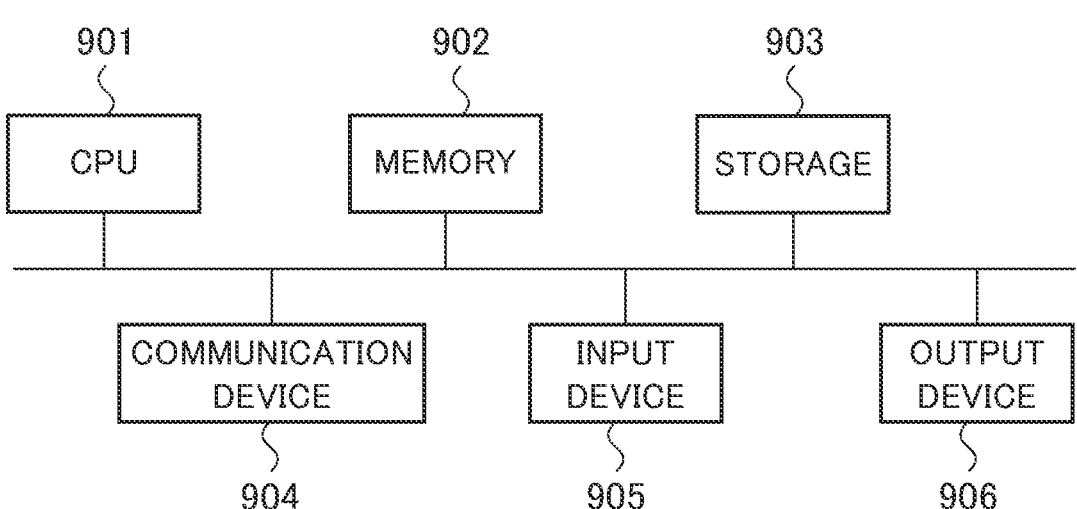
FIG. 8 is a diagram for explaining a hardware configuration of a computer used for a terminal.

With reference to FIG. 7, processing performed in a communication system 5*a* (not shown) will be described. Processing shown in FIG. 7 is an example and is not limited thereto.

In step S151, the terminal 1*a* generates the control data 22 from the action data 21. In step S152, the partner terminal 2*a* generates control data (other avatar control data 23) from action data input from the user of the partner terminal 2*a*.

In step S153, the control data 22 generated by the terminal 1*a* is transmitted to the partner terminal 2*a*, and the control data generated by the partner terminal 2*a* is transmitted to the terminal 1*a*. In steps S154 and S155, the terminal 1*a* and the partner terminal 2*a* reproduce the video data in which each avatar is active in the virtual space according to control data generated by a self-terminal and control data generated by another terminal.

In step S156, the terminal 1*a* detects the action of the avatar who is about to speak in the action data 21. In step S157, the terminal 1*a* generates the instruction data 24*m* indicating that the avatar is about to speak. In step S158, the terminal 1*a* generates the control data 22 from the action data 21. In step S159, the partner terminal 2*a* generates control data for focusing on the avatar corresponding to the terminal 1*a* that transmits the instruction data 24*m*.

In step S160, the control data 22 generated by the terminal 1*a* is transmitted to the partner terminal 2*a*, and the control data generated by the partner terminal 2*a* is transmitted to the terminal 1*a*. In steps S161 and S162, the terminal 1*a* and the partner terminal 2*a* reproduce the video data in which each avatar is active in the virtual space according to control data generated by a self-terminal and control data generated by another terminal. The avatar of the partner terminal 2*a* performs an action of paying attention to the avatar of the terminal 1*a* in a virtual space reproduced by each of the terminal 1*a* and the partner terminal 2*a*, regardless of the action data input by the user of the partner terminal 2*a*.

In the modified example, when the action of the user who is about to speak is detected in the action data 21 input from the user of the terminal 1*a*, the terminal 1*a* transmits the instruction data 24*m* indicating that the user is about to speak to the partner terminal 2*a*. The partner terminal 2*a* generates control data 22 indicating the action of paying attention to the avatar of the terminal 1*a*. The generated control data 22 is reproduced by the terminal 1 and the partner terminal 2*a*, the avatar of the terminal 1*a* attracts attention, and information that the avatar is about to speak is recognized among participants participating in a conversation. An environment is achieved in which the avatar of the terminal 1*a* can speak easily, and the user of the terminal 1*a* can obtain an opportunity in which the avatar can speak easily. In this way, the terminal 1*a* can realize an environment in which the user participating in the conversation in the virtual space can speak easily.

For the terminal 1 of the present embodiment described above, a general-purpose computer system is used, which includes a CPU (Central Processing Unit, processor) 901, a memory 902, a storage 903 (HDD: Hard Disk Drive, SSD: Solid State Drive), a communication device 904, an input device 905, and an output device 906, for example. In the computer system, each function of the terminal 1 is realized by the CPU 901 executing a program loaded on the memory 902.

The terminal 1 may be implemented by one computer or by a plurality of computers. Further, the terminal 1 may be a virtual machine implemented on a computer.

The program of the terminal 1 may be stored on a computer-readable recording medium such as an HDD, SSD, Universal Serial Bus (USB) memory, Compact Disc (CD), or Digital Versatile Disc (DVD), or may be distributed via a network.

Note that the present invention is not limited to the embodiment described above, and various modifications can be made within the gist thereof.

REFERENCE SIGNS LIST

1 Terminal
2 Partner terminal
3 Server
4 Network
5 Communication system
21 Action data
22 Control data
23 Other avatar control data
24 Instruction data
31 Acquiring unit
32 Generating unit
33 Transmitting unit
34 Receiving unit
35 Reproducing unit
901 CPU
902 Memory
903 Storage
904 Communication device
11, 905 Input device
12,906 Output device

The invention claimed is:

1. A terminal comprising:

an acquiring unit, implemented by one or more processors, configured to acquire action data of a user participating in a conversation in a virtual space;

a generating unit, implemented by the one or more processors, configured to generate control data of an avatar corresponding to the user from the action data of the user and generate control data indicating an action that makes it easy for the avatar to speak in the virtual space after detecting a prescribed action of the user who is about to speak in the action data of the user, wherein the control data represents an action of the avatar of the user in the virtual space, the control data before detecting the prescribed action is corresponding to an action of the user, the control data after detecting the prescribed action is not corresponding to the action of the user at least in part, and the generating unit converts a parameter of a movement in the action data at least in part to generate the control data and the control data prompts another avatar of another user to pay attention to the avatar of the user;

a transmitting unit, implemented by the one or more processors, configured transmit the control data; and a reproducing unit, implemented by the one or more processors, configured to make the avatar active in the virtual space according to the control data.

2. The terminal according to claim 1, wherein if the avatar does not speak after transmission of the control data indicating the action that makes it easy for the avatar to speak, the generating unit generates control data from the action data.

3. The terminal according to claim 1, wherein after detecting the prescribed action of the user who is about to speak in the action data, the generating unit generates the control data indicating a part related to the action that makes it easy for the avatar to speak and the action that makes it easy for the avatar to speak, and

the reproducing unit makes the avatar active in the virtual space according to the control data indicating the action that makes it easy for the avatar to speak.

4. The terminal according to claim 1, wherein after receiving instruction data indicating that an avatar corresponding to a user of another terminal is about to speak, the generating unit generates control data indicating an action of focusing on the avatar corresponding to the user of the other terminal.

5. The terminal according to claim 1, wherein the control data after detecting the prescribed action represents an action that makes it easy for another avatar to pay attention to the avatar of the user.

6. The terminal according to claim 1, wherein the action data represents any of a change in a facial expression of the user, an amount that a mouth of the user is opened, an amount that a hand of the user is raised, and a nodding by the user.

7. The terminal according to claim 1, wherein the control data represents controlling the avatar of the user to, in the virtual space, any of raise a hand of the avatar, open a mouth of the avatar, change a facial expression of the avatar, lean the avatar, and approach a second avatar, of another user in the virtual space.

8. The terminal according to claim 1, wherein the control data represents controlling at least one a second avatar, of another user in the virtual space, to automatically face, in the virtual space, the avatar of the user.

9. The terminal according to claim 1, wherein the control data after detecting the prescribed action makes the another avatar of the another user to move within the virtual space.

10. The terminal according to claim 1, wherein the control data after detecting the prescribed action makes the another avatar of the another user to move towards the avatar of the user within the virtual space.

11. A communication system comprising:

a first terminal used by a first user participating in a conversation in a virtual space; and a second terminal that is connected to the first terminal and is used by a second user participating in the conversation; wherein the first terminal includes:

an acquiring unit, implemented by one or more processors, configured to acquire action data of the first user;

a generating unit, implemented by the one or more processors, configured to generate control data of a first avatar corresponding to the first user from the action data of the first user and generate control data indicating an action that makes it easy for the first avatar to speak in the virtual space after detecting a prescribed action of the first user who is about to speak in the action data of the first user, wherein the control data represents an action of the avatar of the user in the virtual space, the control data before detecting the prescribed action is corresponding to an action of the user, and the control data after detecting the prescribed action is not corresponding to the action of the user at least in part and the generating unit converts a parameter of a movement in the action data at least in part to generate the control data and the control data prompts another avatar of another user to pay attention to the avatar of the user;

a transmitting unit, implemented by the one or more processors, configured transmit the control data to the second terminal;

a receiving unit, implemented by the one or more processors, configured to receive other avatar control data from the second terminal; and a reproducing unit, implemented by the one or more processors, configured to make the first avatar active in the virtual space according to the control data and makes a second avatar corresponding to the second user active according to the other avatar control data.

12. A communication system comprising:

a first terminal used by a first user participating in a conversation in a virtual space; and a second terminal that is connected to the first terminal and is used by a second user participating in the conversation, wherein the first terminal includes:

an acquiring unit, implemented by one or more processors, configured to acquire action data of the first user;

a generating unit, implemented by the one or more processors, configured to generate control data of a first avatar corresponding to the first user from the action data of the first user and generate instruction data indicating that the first avatar is about to speak in the virtual space after detecting a prescribed action of the first user who is about to speak in the action data of the first user, wherein the control data represents an action of the avatar of the user in the virtual space, the control data before detecting the prescribed action is corresponding to an action of the user, and the control data after detecting the prescribed action is not corresponding to the action of the user at least in part; and a transmitting unit, implemented by the one or more processors, configured transmit the instruction data to the second terminal, the second terminal includes:

an acquiring unit, implemented by the one or more processors, configured to acquire action data of the second user;

a generating unit, implemented by the one or more processors, configured to generate control data of a second avatar corresponding to the second user from the action data of the second user and generate control data of the second avatar indicating an action of focusing on the first avatar after receiving the instruction data, wherein the generating unit in the second terminal converts a parameter of a movement in the action data of the second user at least in part to generate the control data of the second avatar and the control data of the second avatar prompts the first avatar of the first user to speak; and a transmitting unit, implemented by the one or more processors, configured to transmit the control data of the second avatar to the first terminal, and the first terminal further includes:

a reproducing unit, implemented by the one or more processors, configured to make the first avatar active in the virtual space according to the control data of the first avatar and make the second avatar active according to the control data of the second avatar.

* * * * *